United States Patent [19]
Benevelli

[11] Patent Number: 5,247,989
[45] Date of Patent: * Sep. 28, 1993

[54] MODULATED TEMPERATURE CONTROL FOR ENVIRONMENTAL CHAMBER

[75] Inventor: John A. Benevelli, Burbank, Ill.

[73] Assignee: Lab-Line Instruments, Inc., Melrose Park, Ill.

[*] Notice: The portion of the term of this patent subsequent to Jul. 13, 2010 has been disclaimed.

[21] Appl. No.: 841,552

[22] Filed: Feb. 26, 1992

Related U.S. Application Data

[63] Continuation-in-part of Ser. No. 792,705, Nov. 15, 1991, Pat. No. 5,226,472.

[51] Int. Cl.⁵ .............................................. F25B 29/00
[52] U.S. Cl. ........................................ 165/30; 62/217
[58] Field of Search ...................... 62/217; 165/30, 14

[56] References Cited

U.S. PATENT DOCUMENTS

| | | | |
|---|---|---|---|
| 3,698,204 | 10/1972 | Schlotterbeck et al. | 62/217 X |
| 4,494,184 | 1/1985 | Crevel | 165/30 X |
| 4,566,528 | 1/1985 | Helmle et al. | 165/26 |
| 4,589,060 | 5/1986 | Zinsmeyer | 62/217 X |
| 4,663,725 | 5/1987 | Truckenbrod et al. | 165/505 |
| 4,784,213 | 11/1988 | Eager et al. | 165/30 X |
| 4,789,025 | 12/1988 | Brandemuehl et al. | 165/30 |
| 4,928,750 | 5/1990 | Nurczyk | 165/2 |

OTHER PUBLICATIONS

ALCO Co. catalog pp. 105-108 for "PETR" control valve., no date given.

Primary Examiner—Stephen M. Hepperle
Attorney, Agent, or Firm—Emrich & Dithmar

[57] ABSTRACT

A temperature-controlled environmental chamber includes a resistance heater powered through a first solid state relay and a refrigeration unit including an electrically powered thermally controlled suction throttling valve connected in the refrigerant line between the evaporator and the inlet of the compressor, and including a bimetal motor and a heating element therefor powered through a second solid state relay. A thermostat senses the temperature in the chamber and compares it to a set point temperature and outputs a pulse-width modulated control signal indicative of the difference between the two temperatures. The control signal directly controls the heater relay for substantially continuous variation of the heater between minimum and maximum heating conditions. The control signal also directly controls the throttling valve relay by controlling the power to its heating element for substantially continuous variation of the valve between maximum and minimum cooling conditions, so that the amount of cooling provided is inversely proportional to the amount of heating provided.

7 Claims, 2 Drawing Sheets

MODULATED TEMPERATURE CONTROL FOR ENVIRONMENTAL CHAMBER

CROSS-REFERENCE TO RELATED APPLICATION

This is a continuation-in-part of U.S. application Ser. No. 792,705, now U.S. Pat. No. 5,226,472, filed Nov. 15, 1991 and entitled "Modulated Temperature Control for Environmental Chamber".

BACKGROUND OF THE INVENTION

1. Field of the Invention

The present invention relates to temperature-controlled spaces, such as environmental chambers and, in particular, to a control system for controlling the temperature of such a space.

2. Description of the Prior Art

The aforementioned co-pending application Ser. No. 792,705 provides a modulated temperature control system which simultaneously controls the heating and refrigeration units in opposite directions substantially continuously between minimum and maximum heating and cooling conditions. However, that system utilizes an electronic suction throttling valve which requires an expensive modulation circuit to modify the control signal so that it is suitable for application to the throttling valve.

SUMMARY OF THE INVENTION

It is a general object of the present invention to provide an improved temperature control system for a served space which avoids the disadvantages of prior control systems while affording additional structural and operating advantages.

An important feature of the invention is the provision of apparatus for controlling the air temperature of a served space by simultaneous control of heating and refrigeration units in opposite directions substantially continuously between minimum and maximum heating or cooling conditions.

In connection with the foregoing features, another feature of the invention is a provision of apparatus of the type set forth which utilizes the same control signal for effecting control of both the heating and refrigeration units.

Yet another feature of the invention is the provision of an apparatus of the type set forth, which is of relatively simple and economical construction.

These and other features of the invention are attained by providing in an apparatus for controlling the air temperature of a served space which is equipped with a heating unit and a refrigeration unit, including a thermostat which senses the temperature in the served space and generates a control signal indicative of the difference between the sensed temperature and a predetermined set point temperature, the improvement comprising: valve means in the refrigeration unit for controlling the flow of refrigerant therethrough, drive means for the valve means for effecting continuous control thereof between fully open and fully closed conditions, relay means coupled directly to the thermostat, and power supply means coupled through the relay means to the heating unit and to the drive means for powering both the heating unit and the drive means, the relay means being responsive to the control signal for controlling the operation of the heating unit and the refrigeration unit in a push-pull manner such that the amount of cooling provided is inversely proportional to the amount of heating providing.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

DESCRIPTION OF THE PREFERRED EMBODIMENT

Figure 1:
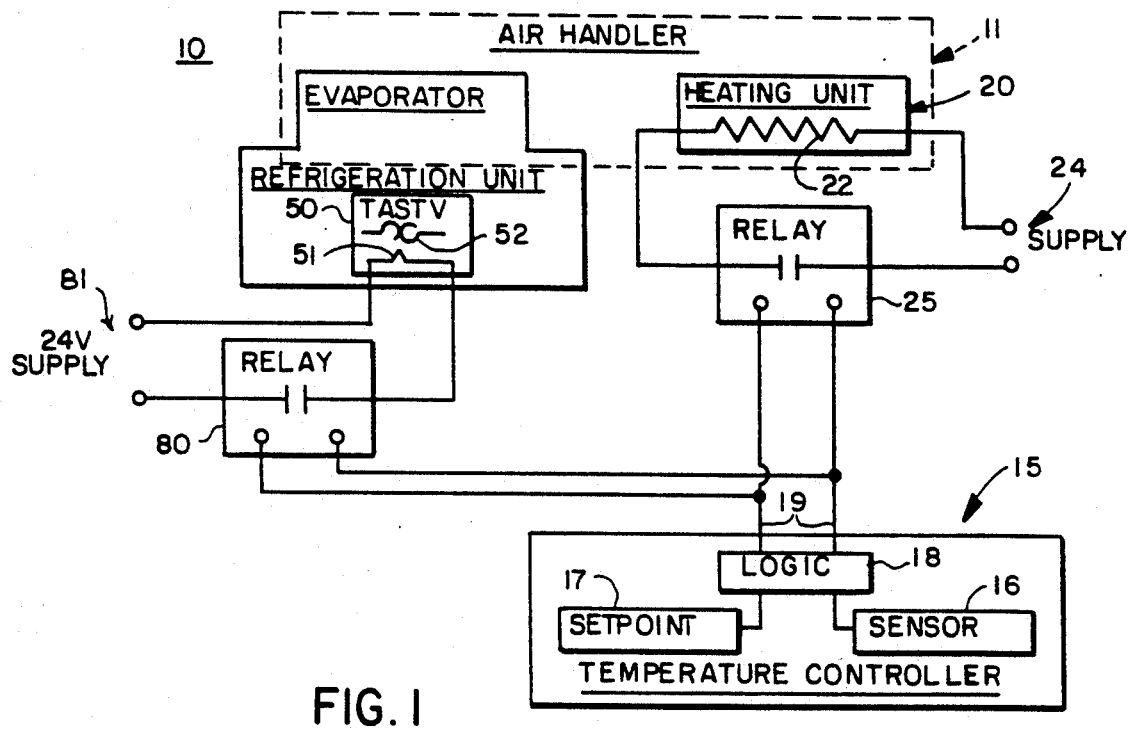
FIG. 1 is a partially schematic and partially functional block diagrammatic illustration of the temperature control system of the present invention.

Referring to FIG. 1, there is illustrated a temperature control system, generally designated by the numeral 10, constructed in accordance with and embodying the features of the present invention.

The temperature control system 10 is of the type which may be used for controlling the temperature in a served space, such as an environmental chamber, and includes an air handler 11 for controlling the flow of air through the served space. The temperature control system 10 includes a thermostat or temperature controller 15, which may be a microprocessor-controlled device, such as that sold by Eurotherm Corporation under the model number 808. The temperature controller 15 includes a sensor 16 for sensing the temperature of the air in the served space, a set point control unit 17 for setting the predetermined temperature which is to be maintained in the served space, and a comparator 18 which receives the inputs from the sensor 16 and the set point control unit 17 and generates on output terminals 19 a pulse-width-modulated ("PWM") signal which is indicative of the difference between the set point temperature and the actual sensed temperature.

The temperature control system 10 also includes a heating unit 20 and a refrigeration unit 30 for, respectively, heating and cooling the air in the served space. The heating unit 20 preferably includes a resistance heater 22 which is disposed in the air stream of the air handler 11 of the served space and is connected across an associated power supply 24 through the normally-open contacts of a solid state relay 25. The control terminals of the relay 25 are connected to the output terminals 19 of the temperature controller 15 for closing the relay contacts when the PWM output signal from the comparator 18 is high, as will be explained more fully below.

Figure 2:
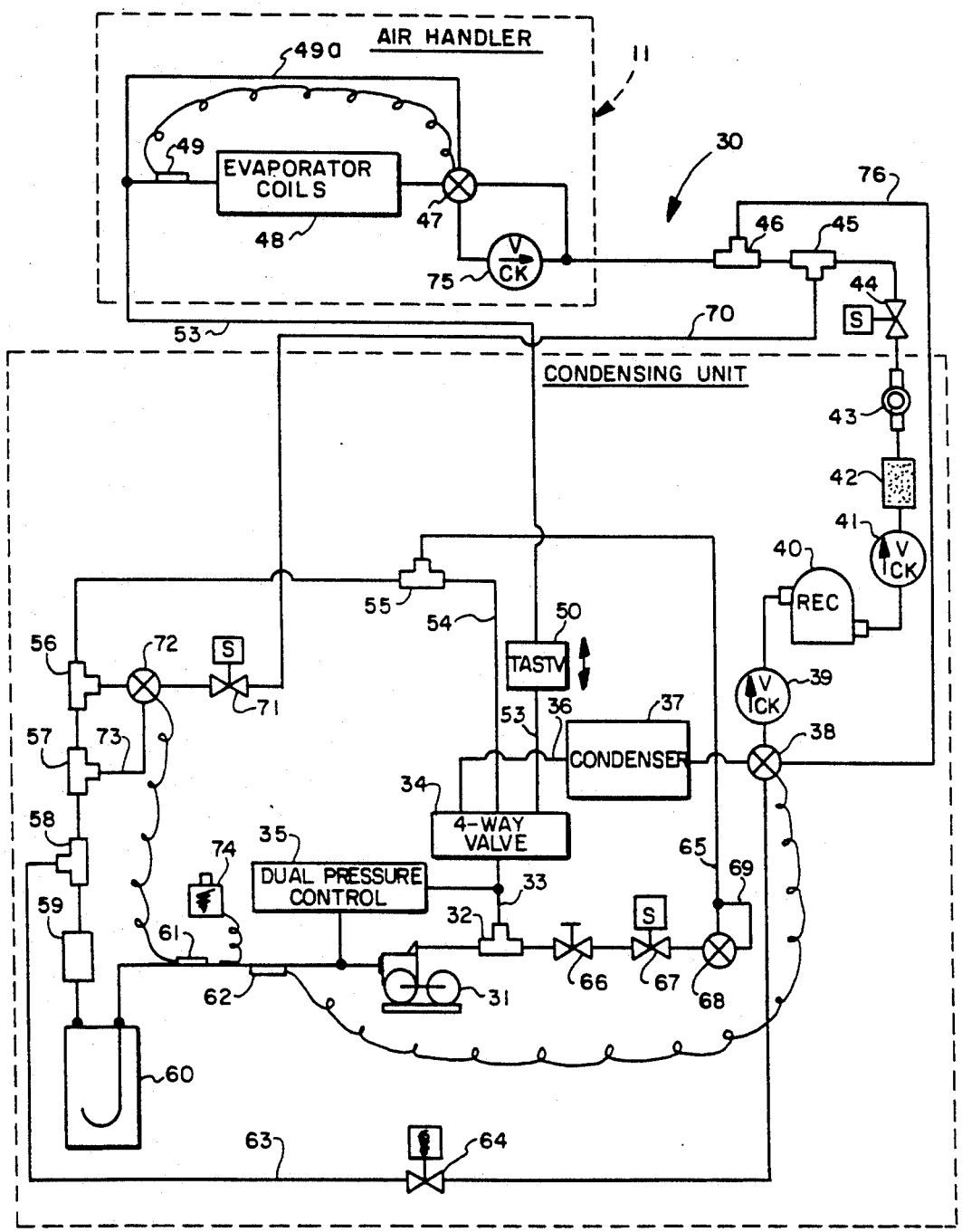
FIG. 2 is a fluid-flow schematic diagram of the refrigeration unit of the temperature control system of FIG. 1.

Referring also to FIG. 2, the refrigeration unit 30 is largely of conventional construction, including a compressor, a condenser and an evaporator interconnected by associated conduits. More specifically, the refrigeration unit 30 includes a compressor 31, the output of which is coupled through a T-fitting 32, one branch of which is coupled via a refrigerant line 33 to a first port of a four-way valve 34. The line 33 is coupled to the input of the compressor 31 through a dual pressure control unit 35 which monitors the pressures at the input and the output of the compressor 31 in a known manner. A second port of the four-way valve 34 is coupled by a refrigerant line 36 to the input of a condenser 37, the output of which is coupled through the bypass port of a thermal expansion valve 38 and a check valve 39 to a receiver 40. The output of the receiver 40 is coupled through another check valve 41, a filter drier 42, a sight glass 43, a solenoid valve 44, a pair of T-fittings 45 and 46, and a thermal expansion valve 47 to the input of evaporator coils 48, which are located in the air stream of the air handler 11 of the served space. An external equalization line 49a is provided around the evaporator coils 48 between the output thereof and the thermal expansion valve 47. Also located on the output line from the evaporator coils 48 is a temperature sensing bulb 49 for controlling the operation of the thermal expansion valve 47 in a known manner.

The output of the evaporator coils 48 is also coupled to the input of an electrically powered, thermally or heat motor activated suction throttling valve ("TASTV") 50, which is a normally-open, heater-operated valve, which may be of the type sold by ALCO Company under the trade designation "PETR". The TASTV 50 includes a heating element 51 which operates a bimetallic motor 52 (FIG. 1). TASTV 50 is typically also provided with an external electronics package to modulate the valve and a temperature sensing probe to monitor return air, but neither of these latter features is used with the present invention, since the TASTV will be controlled by the temperature controller 15, as will be explained more fully below. The TASTV 50 operates substantially continuously between fully-open and fully-closed conditions, and operates by responding to the pulsating voltage at the output of the temperature controller 15, as explained below. The output of the TASTV 50 is coupled by a line 53 to a third port of the four-way valve 34, a fourth port of which is coupled via a line 54, T-fittings 55, 56, 57 and 58 and a crankcase pressure regulator valve 59 to a suction accumulator 60 which is, in turn, coupled to the input of the compressor 31. Located on the compressor input line are temperature sensing bulbs 61 and 62, the latter controlling the thermal expansion valve 38. An external equalization line 63 is also connected around the compressor 31 between the T-fitting 58 and the thermal expansion valve 38 through a solenoid valve 64.

There is also provided a hot gas bypass line 65 which is coupled between the output and the input of the compressor 31. More specifically, the hot gas bypass line 65 is coupled from the T-fitting 32 through a hand valve 66, a solenoid valve 67 and a capacity valve 68 to the T-fitting 55, an external equalization line 69 being provided for the capacity valve 68. The solenoid of the solenoid valve 67 is controlled by a temperature control unit 74 which is coupled to the input of the compressor 31. The temperature control system 10 also includes a refrigeration bypass line 70, which is coupled from the T-fittinq 45 through a solenoid valve 71 and a thermal expansion valve 72 to the T-fitting 56. The thermal expansion valve 72 is controlled by the temperature sensing bulb 61 and is provided with an external equalization line 73 coupled to the T-fitting 57.

In operation, the hot gas bypass line 65 serves to maintain adequate input pressure to the compressor 31. Thus, for example, when the TASTV 50 reaches a nearly fully closed condition, the pressure at the input of the compressor 31 may drop to a predetermined minimum pressure. This drop in pressure will be sensed by the capacity valve 68 via the line 65 which is coupled to the input of the compressor 31, thereby causing the capacity valve 68 to be opened to bypass hot gas from the output of the compressor 31 back to its input without going through the condenser 37. This maintains the compressor input pressure above the predetermined minimum value for which the capacity valve 68 has been set. If the temperature at the input of the compressor 31 becomes too high, the signal from the sensing bulb 61 will further open the thermal expansion valve 72 to increase the flow of cold refrigerant from the output of the receiver 40 directly to the input of the compressor 31 via the line 70 without going through the evaporator coils 48, thereby to maintain the temperature at the input of the compressor 31 at or below predetermined maximum temperature. As a further safety feature, if the temperature at the input of the compressor 31 reaches a higher predetermined temperature, the temperature controller 74 will actuate the solenoid of the solenoid valve 67 to close the valve 67 and prevent the flow of hot gas through the capacity valve 68 in the hot gas bypass line 65.

It will be appreciated that, in normal operation, the compressor 31 is substantially continuously operating. However, if the temperature at the input of the compressor 31 becomes too high or too low, it will be automatically shut off by associated control circuitry (not shown) in a known manner, although the refrigerant bypass line 70, described above, is designed to prevent high-temperature shut off. It will also be appreciated that the compressor 31 is designed to automatically shut off if the input pressure becomes too low or the output pressure becomes too high but, as was indicated above, the hot gas bypass line 65 is designed to prevent low-pressure shut off of the compressor 31.

In normal operation, the refrigerant flow is from the output of the compressor 31 through the line 33, the four-way valve 34, the line 36 and the condenser 37, and thence through the bypass port of the thermal expansion valve 38 and the receiver 40 to the thermal expansion valve 47 and the evaporator coils 48 for cooling the air in the served space. The evaporated refrigerant then flows through the TASTV 50 back through the four-way valve 34, the line 54 and the accumulator 60 to the input of the compressor 31 for repeating the cycle.

It will be appreciated that if the air temperature at the evaporator coils 48 drops below freezing, the water vapor in the served space will freeze on the coil surfaces, so the temperature control system 10 is also designed to operate in a defrost mode. In this event, the four-way valve 34 switches to reverse the flow of refrigerant through the system. More specifically, in the defrost mode, the compressor output line 33 is coupled to the line 53 and the condenser line 36 is coupled to the compressor input line 54. Thus, it will be appreciated that, in the defrost mode, the compressed refrigerant passes through the TASTV 50 and then in a reverse direction through the evaporator coils 48, which act as a condenser, thence through the bypass port of the thermal expansion valve 47 and a check valve 75. The refrigerant then flows through a bypass line 76 around the receiver 40 through the thermal expansion valve 38 and in a reverse direction through the condenser 37, which acts as an evaporator, then back through the four-way valve 34 and the line 54 to the input of the compressor 31.

Figure 3:
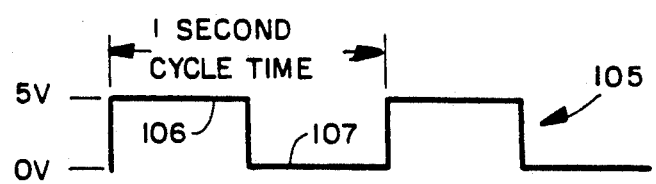
FIG. 3 is a waveform diagram illustrating the signal at the output of the temperature controller 15.

Referring now to FIGS. 1 and 3, the temperature control system 10 also includes a solid state relay 80 which is coupled to the output terminals 19 of the temperature controller 15. A suitable power supply 81, which may be a 24-volt supply, is connected through the normally-open contacts of the relay 80 to the heating element 51 of the TASTV 50.

In operation, to effect control of the TASTV 50, the output signal from the temperature controller 15 is a PWM signal 105 (FIG. 3) which has a high level 106 at substantially +5 volts and a low level 107 at 0 volts and is set to have a period or cycle time of approximately one second between adjacent low-to-high transitions. The signal 105 is illustrated with a 50% duty cycle, for purposes of discussion, but it will be appreciated that the duty cycle may vary between 0 and 100%, depending upon the difference between the sensed temperature in the served space and the set point temperature.

Figure 4:
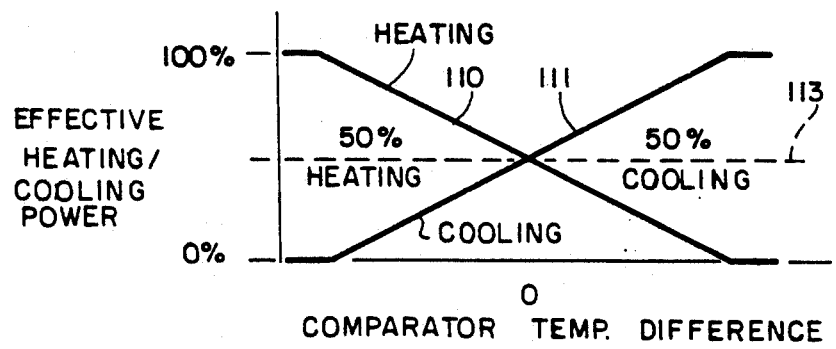
FIG. 4 is a graph illustrating the heating and cooling power outputs of the temperature control system of FIG. 1.

In overall operation, when the temperature controller 15 detects a difference between the sensed temperature and the set point temperature, it will change the duty cycle of the PWM output signal 105 accordingly. Thus, if the sensed temperature is too low, the duty cycle of the PWM signal 105 will be increased, thereby effectively increasing the heating output of the heating unit 20. More specifically, whenever the output signal 105 is high, the contacts of the relay 25 will close, turning the heater 22 on. Thus, the greater the duty cycle of the PWM waveform, the greater the percentage of time during each cycle that the heater 22 will be on and, correspondingly, the greater the overall heating output. Accordingly, it will be appreciated that the heating output from the heating unit 20 can be substantially continuously varied between a minimum heating output, which is substantially 0 when the PWM waveform 105 has a zero duty cycle and the heater 22 is continuously off, and a maximum heating output of substantially 100%, when the PWM waveform 105 has a 100% duty cycle and the heater 22 is continuously on. This variation is illustrated by the curve 110 in FIG. 4.

It is a fundamental aspect of the present invention that the PWM signal 105 which controls the heating unit 20 simultaneously effects a corresponding, but inverse control of the refrigeration unit 30 so that, as the heating output is increased the cooling output is correspondingly decreased, and vice versa. Thus, in the event that the sensed temperature is too low, e.g., the temperature control system 10 will compensate by not only increasing the heating output but also by simultaneously decreasing the cooling output, for more rapidly bringing the temperature of the served space into regulation at the set point temperature.

The TASTV 50 is normally in a fully opened condition, accommodating maximum refrigerant flow through the evaporator coils 48 and, accordingly, maximum cooling output. Whenever the output signal 105 from the temperature controller 15 is high, the contacts of the relay 80 will close, turning on the heating element 51 of the TASTV 50. Thus, the greater the duty cycle of the PWM waveform, the greater the percentage of time during each cycle that the heating element 51 will be on and, correspondingly, the greater the heating output therefrom. As the heat from the heating element 51 increases, a bimetallic motor 52 (FIG. 1) in the TASTV 50 responds to close the TASTV 50, thereby reducing the flow of refrigerant through the evaporator coils 48 and, thereby, correspondingly reducing the cooling output. In like manner, as the duty cycle of the PWM waveform 105 decreases, reducing the heating output of the heating unit 20, the voltage applied to the TASTV heating element 51 also decreases, further opening the TASTV 50 to increase the cooling output.

This "push-pull" type of operation is illustrated in FIG. 5, wherein it can be seen that a decrease in the heating output curve 110 results in a corresponding increase in the cooling output curve 111. When each of the heating unit 20 and the refrigeration unit 30 are producing about 50% of their maximum output, the curves 110 and 111 intersect substantially along the 50% heating and cooling level 113.

Modern microprocessor-based temperature controllers, such as the Eurotherm Model 808 mentioned above, provide superior PID (proportion-integral-derivative) algorithms for enabling precision proportional throttling back of applied power as the set point temperature is reached, automatic reset to eliminate proportional droop and rate control to correct for set point overshoot. These algorithms have heretofore been used only to control heating. The present invention synchronously modulates cooling inversely proportional to the heater control, thereby taking advantage of the PID algorithms for cooling as well as heating and substantially improving corrections to temperature drift from set point in either direction.

From the foregoing, it can be seen that there has been provided an improved temperature control system which effects simultaneous control of a heating unit and a refrigeration unit in a "push-pull" or inverse manner, so that an increase in heating output results in a corresponding decrease in cooling output, and vice versa. Both the heating unit and the refrigeration unit can be controlled by the same unmodified thermostat output signal in a substantially continuous manner between substantially 0% and substantially 100% output, thereby providing an effective modulated control without the need for cycling either the evaporator or the compressor of the refrigeration unit on or off with the use of mechanical relays, and without having to use dampers and associated ductwork for separately controlling the flow of heated and cooled air. There results an efficient and fast-acting temperature control system which is of relatively simple and economical construction and does not require the use of a modulator circuit board.

I claim:

1. In an apparatus for controlling the air temperature of a served space which is equipped with a heating unit and a refrigeration unit, including a thermostat which senses the temperature in the served space and generates a control signal indicative of the difference between the sensed temperature and a predetermined set point temperature, the improvement comprising: valve means in said refrigeration unit for controlling the flow of refrigerant therethrough, drive means for said valve means for effecting continuous control thereof between fully open and fully closed conditions, relay means coupled directly to the thermostat, and power supply means coupled through said relay means to the heating unit and to said drive means for powering both the heating unit and said drive means, said relay means being responsive to the control signal for controlling the operation of the heating unit and the refrigeration unit in a push-pull manner such that the amount of cooling provided is inversely proportional to the amount of heating providing.

2. The apparatus of claim 1, wherein the thermostat includes means for generating a pulse-width-modulated control signal.

3. The apparatus of claim 1, wherein said valve means includes a thermally controlled suction throttling valve.

4. The apparatus of claim 3, wherein said drive means includes a bimetal motor and a heating element connected to said power supply means for operating said motor.

5. The apparatus of claim 1, wherein said relay means includes a first relay coupled to the heating unit for controlling the operation thereof, and a second relay coupled to the refrigeration unit for controlling the operation thereof.

6. The apparatus of claim 5, wherein said power supply means includes a first voltage source coupled to the heating unit through said first relay and a second voltage source coupled to said drive means through said second relay.

7. The apparatus of claim 6, wherein said drive means includes a bimetal motor and a heating element connected to said second voltage source through said second relay for operating said motor.

* * * * *